United States Patent
Lazaridis et al.

(10) Patent No.: US 9,697,389 B2
(45) Date of Patent: Jul. 4, 2017

(54) PORTABLE SMART CARD READER HAVING SECURE WIRELESS COMMUNICATIONS CAPABILITY

(71) Applicant: Research In Motion Limited, Waterloo (CA)

(72) Inventors: Mihal Lazaridis, Waterloo (CA); Kwok Ching Leung, Richmond Hill (CA); Benjamin William Boomhour, Waterloo (CA); Scott Douglas Rose, Waterloo (CA); Scott William Totzke, Waterloo (CA); Ryan Mitchell Bayne, Waterloo (CA); Herbert Anthony Little, Waterloo (CA)

(73) Assignee: BlackBerry Limited, Waterloo (CA)

( * ) Notice: Subject to any disclaimer, the term of this patent is extended or adjusted under 35 U.S.C. 154(b) by 101 days.

(21) Appl. No.: 13/871,386

(22) Filed: Apr. 26, 2013

(65) Prior Publication Data

US 2013/0233925 A1     Sep. 12, 2013

Related U.S. Application Data

(63) Continuation of application No. 12/501,812, filed on Jul. 13, 2009, now Pat. No. 8,433,904, which is a (Continued)

(51) Int. Cl.
*G06K 7/01* (2006.01)
*H04L 9/08* (2006.01)
(Continued)

(52) U.S. Cl.
CPC .............. *G06K 7/01* (2013.01); *H04L 9/0841* (2013.01); *H04L 9/0877* (2013.01);
(Continued)

(58) Field of Classification Search
None
See application file for complete search history.

(56) References Cited

U.S. PATENT DOCUMENTS

| 5,015,830 A | 5/1991 | Masuzawa et al. |
| 5,640,307 A | 6/1997 | Bleier et al. |
| | (Continued) | |

FOREIGN PATENT DOCUMENTS

| CA | 2541741 | 9/2010 |
| EP | 0 703 676 A | 3/1996 |
| | (Continued) | |

OTHER PUBLICATIONS

United States Patent and Trademark Office, Notice of Allowance dated Mar. 3, 2009 in respect of U.S. Appl. No. 11/098,594.
(Continued)

*Primary Examiner* — Kaveh Abrishamkar
(74) *Attorney, Agent, or Firm* — Ridout & Maybee LLP (57) ABSTRACT

A reader device includes a housing for receiving a smart card, a processor in electronic communication with an integrated circuit chip of the smart card when the smart card is received in the housing, a wireless communications device in electronic communication with the processor for enabling the reader device to transmit first encrypted information wirelessly and to receive second encrypted information wirelessly, and a memory in electronic communication with the processor that includes one or more routines executable by the processor. The one or more routines include a cryptographic module adapted to encrypt first information to create the first encrypted information and decrypt the second encrypted information to obtain second information. In addition, a communication system that includes the reader device and a computing device, wherein
(Continued)

the reader device and computing device are able to wirelessly exchange information in a secure manner.

10 Claims, 7 Drawing Sheets

Related U.S. Application Data continuation of application No. 11/098,594, filed on Apr. 4, 2005, now Pat. No. 7,562,219.

(51) Int. Cl.
*H04W 12/04* (2009.01)
*H04W 12/02* (2009.01)

(52) U.S. Cl.
CPC ......... *H04W 12/04* (2013.01); *H04L 2209/80* (2013.01); *H04W 12/02* (2013.01)

(56) References Cited

U.S. PATENT DOCUMENTS

| | | | |
|---|---|---|---|
| D396,452 S | 7/1998 | Naruki | |
| 5,796,085 A | 8/1998 | Bleier | |
| D405,070 S | 2/1999 | Kitagawa et al. | |
| D423,470 S | 4/2000 | Neifer et al. | |
| D426,237 S | 6/2000 | Wranne | |
| D475,708 S | 6/2003 | Bergstrom | |
| 6,801,787 B1* | 10/2004 | Page et al. | 455/556.1 |
| 6,802,007 B1* | 10/2004 | Canelones | G06Q 20/341 |
| | | | 705/65 |
| D501,208 S | 1/2005 | Ozolins et al. | |
| 6,990,444 B2 | 1/2006 | Hind et al. | |
| 7,117,364 B1* | 10/2006 | Hepper et al. | 713/176 |
| 7,191,335 B1* | 3/2007 | Maillard | H04N 7/1675 |
| | | | 348/E7.056 |
| 7,357,312 B2 | 4/2008 | Gangi | |
| 7,562,219 B2* | 7/2009 | Lazaridis et al. | 713/168 |
| 7,805,611 B1* | 9/2010 | Montemayor | G06F 21/606 |
| | | | 380/255 |
| 8,433,904 B2* | 4/2013 | Lazaridis et al. | 713/168 |
| 2001/0039621 A1* | 11/2001 | Yamamoto | G06Q 20/341 |
| | | | 713/194 |
| 2001/0045467 A1* | 11/2001 | Manthe | 235/486 |
| 2003/0105954 A1 | 6/2003 | Immonen et al. | |
| 2003/0172280 A1* | 9/2003 | Scheidt | H04L 63/0442 |
| | | | 713/182 |
| 2003/0183691 A1 | 10/2003 | Lahteenmaki et al. | |
| 2004/0188519 A1* | 9/2004 | Cassone | 235/382 |
| 2004/0199474 A1 | 10/2004 | Ritter | |
| 2005/0001712 A1 | 1/2005 | Yarbrough | |
| 2005/0082365 A1* | 4/2005 | Merkert, Sr. | G07C 9/00103 |
| | | | 235/382 |
| 2006/0080547 A1* | 4/2006 | Higashiura | G06F 21/32 |
| | | | 713/186 |
| 2006/0218397 A1* | 9/2006 | Brown | H04L 9/083 |
| | | | 713/168 |

FOREIGN PATENT DOCUMENTS

| | | |
|---|---|---|
| EP | 1 253 559 A | 10/2002 |
| EP | 1349031 | 10/2003 |
| EP | 1471453 | 10/2004 |
| EP | 05252105.1 | 10/2006 |
| EP | 08150806.1 | 4/2008 |
| GB | 2319747 A | 3/1998 |
| WO | 95/14980 A | 6/1995 |
| WO | 02/01520 | 1/2002 |

OTHER PUBLICATIONS

United States Patent and Trademark Office, Non-Final Rejection dated Sep. 30, 2008 in respect of U.S. Appl. No. 11/098,594.
United States Patent and Trademark Office, Notice of Allowance dated Jan. 3, 2013 in respect of U.S. Appl. No. 12/501,812.
United States Patent and Trademark Office, Final Rejection dated Oct. 23, 2012 in respect of U.S. Appl. No. 12/501,812.
United States Patent and Trademark Office, Non-Final Rejection dated May 15, 2012 in respect of U.S. Appl. No. 12/501,812.
European Patent Office, Decision to refuse a European Patent Application dated Nov. 1, 2012 in respect of EP Application No. 08150806.1.
European Patent Office, Summons to attend oral proceedings pursuant to Rule 115(1) EPC dated Jun. 15, 2011 in respect of EP Application No. 08150806.1.
European Patent Office, Summons to oral proceedings pursuant to Rule 115(1) EPC dated Sep. 15, 2011 in respect of EP Application No. 05252105.1.
European Patent Office, Decision of the Technical Board of Appeal dated Jan. 20, 2012 in respect of EP Application No. 0525205.1.

\* cited by examiner

PORTABLE SMART CARD READER HAVING SECURE WIRELESS COMMUNICATIONS CAPABILITY

CROSS-REFERENCE TO RELATED APPLICATIONS

The instant application is a continuation of U.S. patent application Ser. No. 12/501,812, filed on Jul. 13, 2009. U.S. patent application Ser. No. 12/501,812 is a continuation of U.S. patent application Ser. No. 11/098,594, filed on Apr. 4, 2005. The contents of both preceding applications are hereby incorporated herein by reference.

BACKGROUND OF THE INVENTION

1. Field of the Invention

The present invention relates to smart cards and smart card readers, and more particularly, to a portable and preferably wearable smart card reader having secure wireless communications capability.

2. Description of the Prior Art

A smart card is a device, typically about the same size as a credit card, that includes an embedded integrated circuit chip that stores and processes information. Information can be transferred between the smart card and an associated computing device such as a PC, a laptop computer or a handheld electronic device like a PDA, a two way pager, a cell phone or the like, through a reader device that is coupled to the associated computing device. In particular, the reader device is used to make an electrical connection to the integrated circuit of the smart card to provide a communication link between the smart card and the computing device.

In the prior art, the reader devices have been physically coupled to the associated computing device, such as through a wire or some other physical connection. The physical connection provides a level of data security for the transfer of data between the reader device and the smart card. Also, smarts cards are typically protected by an access control mechanism such as a password that must be provided in order the access the information stored on and the functionality provided by the integrated circuit chip of the smart card.

One common application of smart cards is to store cryptographic keys for use in conducting secure communications. For example, a smart card may be used to store cryptographic keys used for encrypting and/or digitally signing electronic mail (email) messages.

As is known in the art, a number of secure, encrypted email protocols have been developed, such as S/MIME and PGP, that use both symmetric (secret key) and asymmetric (public key) cryptography techniques. Generally, according to these protocols, after a sender creates an email message, the sender's email program generates a symmetric session key (appropriate for the chosen symmetric encryption algorithm, such as DES, Triple DES or RC2) and uses the session key to encrypt the email message. The session key is then encrypted using the message recipient's public key (typically obtained from the recipient's public key certificate) and a public key encryption algorithm such as Diffie-Hellman and RSA. Next, a digest of the message is created using a message digest algorithm such as SHA-1 or MD5. The message digest is then encrypted using the sender's private key (to create a digital signature), again employing a public key encryption algorithm such as Diffie-Hellman or RSA. The encrypted session key, the sender's public key certificate, the encrypted message, and the encrypted message digest are then sent to the recipient.

Upon receiving the message, the recipient uses his or her private key to decrypt the encrypted session key which is then used to decrypt the encrypted message. Also, the recipient uses the sender's public key to decrypt the encrypted message digest. The recipient then creates a digest of the decrypted message using the same algorithm used by the sender and compares that digest to the received message digest to authenticate and check the integrity of the message. As an alternative, if message privacy is not a concern, the protocols provide for sending a message that is digitally signed only.

A smart card is often used to store each individual's private key and public key certificate (which includes the individual's public key). When a recipient receives an encrypted email message, the smart card password and encrypted session key are sent to the recipient's smart card (through the reader device) by the recipient's computing device. The smart card then decrypts the encrypted session key using the recipient's private key and send sends the decrypted session key back to the computing device (through the reader device), where it is used thereby to decrypt the email message. In addition, during the preparation of a message, after the message digest is created by the sender's computing device, it and the smart card password are sent to the sender's smart card (through the reader device) where message digest is encrypted using the sender's private key (to create a digital signature) and returned to the computing device.

Many smart cards also carry additional information such as identifying information embodied in a photograph or stored in a readable bar code or magnetic strip. Such identifying information may be used, for example, to provide access to certain restricted locations. It is thus often important for this information to be visible so that it may be readily checked by a guard or the like.

As noted above, in current smart card systems, the reader device is physically coupled to the associated computing device. As a result, the transmission of clear-text session keys (after being decrypted) and clear-text smart card passwords between the two is secure. However, the requirement of a physical connection creates a number of problems and disadvantages. For example, users often forget to remove their smart card from a reader device when they leave their work areas, and thus encounter problems accessing locations that require the identifying information on the smart card. Furthermore, if the smart card is inadvertently not removed from the reader device when the user leaves his or her work are, a security problem arises as another individual could use the still active smart card to access the associated computing device and to falsely send and receive secure messages. In addition, current readers are bulky and are thus difficult to carry around, which presents a problem for users that wish to use them in connection with (and thus physically couple them to) a portable device such as a handheld electronic device.

SUMMARY OF THE INVENTION

The invention solves these and other problems by providing a portable and preferably wearable reader device for a smart card that is able to wirelessly communicate with a computing device in a secure manner. The reader device includes a housing for receiving the smart card, a processor in electronic communication with an integrated circuit chip of the smart card when the smart card is received in the housing, such as through mated electrical contacts provided on each, a wireless communications device in electronic communication with the processor for enabling the reader device to transmit first encrypted information wirelessly and to receive second encrypted information wirelessly, and a memory in electronic communication with the processor that includes one or more routines executable by the processor. The one or more routines include a cryptographic module adapted to encrypt first information to create the first encrypted information and decrypt the second encrypted information to obtain second information.

In the preferred embodiment, the wireless communications device includes a Bluetooth radio, and the first encrypted information is transmitted and the second encrypted information is received using the Bluetooth wireless communications protocol.

In one embodiment, the cryptographic module is adapted to generate a session key and use the session key to encrypt message information to create encrypted message information. The memory in this embodiment stores a shared secret key that is known to a computing device associated with the reader device. The cryptographic module is adapted to use the shared secret key to encrypt the session key to create an encrypted session key. In this case, the first encrypted information that is transmitted by the reader device includes both the encrypted message information and the encrypted session key. Preferably, the cryptographic module is adapted to encrypt the message information and the session key using one or more FIPS-140-2 level 1 or greater approved encryption algorithms.

The housing of the reader device may include a channel for receiving and holding the smart card. Preferably, a portion of the front face of the smart card is visible when the smart card is received in the channel so that information on the front face is visible. The housing may also include one or more attachment mechanisms for attaching the reader device to the clothing or the body of the user, thereby making it wearable. The attachments mechanisms may include, for example, and without limitation, a loop portion for receiving a lanyard or arm portions for receiving and holding a strap.

The invention also relates to a communications system that employs such a reader device. The system includes a smart card having an integrated circuit chip, a reader device including a housing for receiving the smart card, a first processor that is in electronic communication with the integrated circuit chip when the smart card is received in the housing, a first wireless communications device in electronic communication with the first processor, and a first memory in electronic communication with the first processor having one or more first routines executable by the first processor, wherein the routines include a first cryptographic module. The system further includes a computing device including a second processor, a second wireless communications device in electronic communication with the second processor, and a second memory in electronic communication with the second processor having one or more second routines executable by the second processor, wherein the second routines include a second cryptographic module. The reader device and computing device are able to wirelessly communicate with one another in a secure manner. Specifically, the first wireless communications device wirelessly transmits first encrypted information to the second wireless communications device and wirelessly receives second encrypted information transmitted by the second wireless communications device. To create the first encrypted information, first information is encrypted by the first cryptographic module. Similarly, to create the second encrypted information, second information is encrypted by the second cryptographic module. The first cryptographic module is adapted to decrypt the second encrypted information to obtain the second information and the second cryptographic module is adapted to decrypt the first encrypted information to obtain the first information.

In the preferred embodiment, the first memory and the second memory each store a shared secret key. The first cryptographic module is adapted to generate a first session key and use the first session key to encrypt first message information to create first encrypted message information. The first cryptographic module is also adapted to use the shared secret key to encrypt the first session key to create a first encrypted session key. In addition, the second cryptographic module is adapted to generate a second session key and use the second session key to encrypt second message information to create second encrypted message information. The second cryptographic module is also adapted to use the shared secret key to encrypt the second session key to create a second encrypted session key. In this embodiment, the first encrypted information includes the first encrypted message information and the first encrypted session key, and the second encrypted information includes the second encrypted message information and the second encrypted session key.

The invention may be used to facilitate the sending and receiving of encrypted and/or signed email using the computing device. In this case, the second information includes a digest of an email message. The integrated circuit chip of the smart card stores a private key, and the integrated circuit chip is adapted to encrypt the digest using the private key to create a digital signature which is included in the first information that is securely transmitted back to the computing device. Furthermore, the second information may include the smart card password such that it is securely transmitted from the computing device, where it is input by a user, to the reader device. The second information may also include an encrypted email message that was created by encrypting an email message with a public key that corresponds to the private key stored in the smart card. The integrated circuit chip in this case is adapted to decrypt the encrypted email message using the private key to obtain the email message which is then included in the first information that is securely transmitted back to the computing device.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
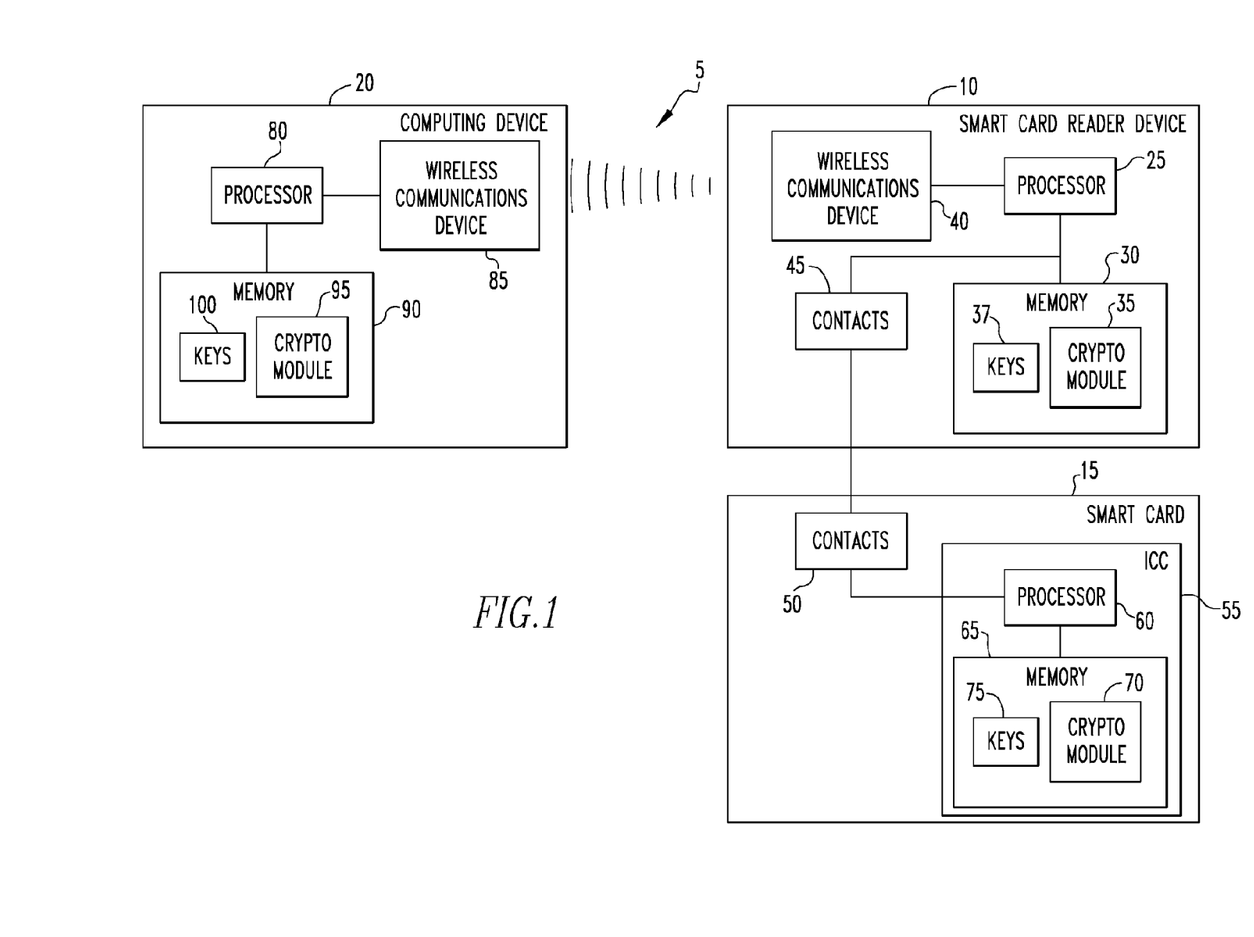
FIG. 1 is a block diagram of a smart card communications system according to the invention.
Figure 2A:
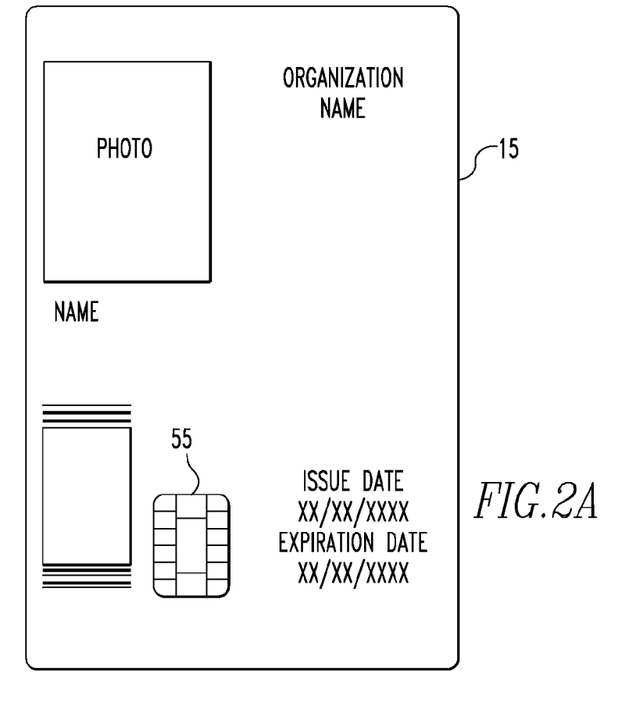
FIGS. 2A and 2B schematic illustrations of the front and back of a sample smart card as shown in FIG. 1.
Figure 2B:
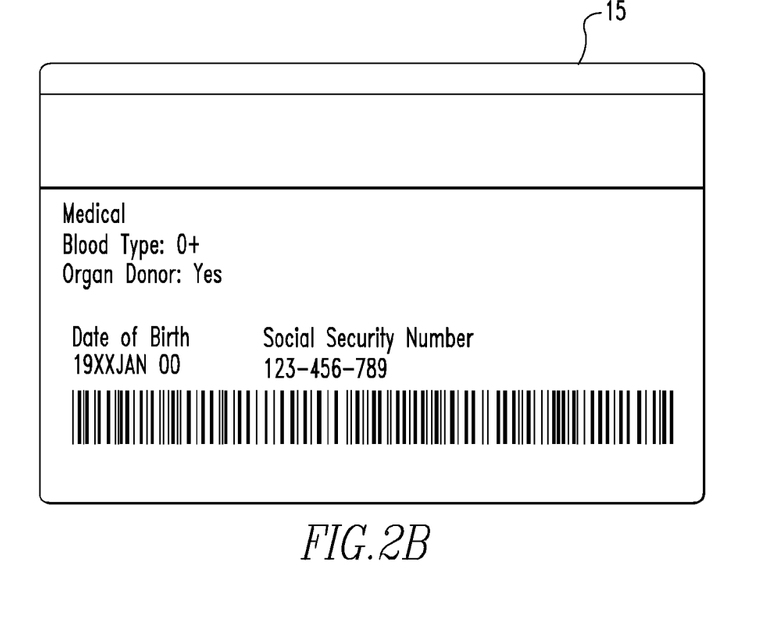

FIG. 1 is a block diagram of a smart card communications system 5 according to the invention. System 5 includes a wireless communication enabled smart card reader device 10, a smart card 15, such as, for example, a smart card as shown in FIGS. 2A and 2B, and a wireless communication enabled computing device 20, which may be, without limitation, a PC, a laptop computer or a handheld electronic device such as a PDA, a two way pager, a cell phone or the like. Examples of handheld electronic devices are included in U.S. Pat. Nos. 6,452,588 and 6,489,950. As shown in FIG. 1, smart card reader device 10 and computing device 20 are able to communicate with one another and exchange information wirelessly, preferably using the Bluetooth wireless communication protocol, although other wireless communication protocols may also be used, including various known or later developed RF wireless communication protocols.

Smart card reader device 10 includes a processor 25, which may be, without limitation, a microprocessor (.mu.P). The processor 25 controls the operation of smart card reader device 10 by executing routines stored in a memory 30 that is in electronic communication with processor 25. The routines can be in any of a variety of forms such as, without limitation, software, firmware, and the like, and shall include one or more subroutines, processes, procedures, function calls or the like, alone or in combination. Memory 30 can be any of a variety of types of internal and/or external storage media such as, without limitation, RAM, ROM, EPROM(s), EEPROM(s), and the like, alone or in combination, that provide a storage register for data storage such as in the fashion of an internal storage area of a computer, and can be volatile memory or nonvolatile memory. Memory 30 includes cryptographic module 35 in the form of one or more of the stored routines. Cryptographic module 35, when executed by processor 25, enables smart card reader device 10 to encrypt and decrypt information using one or more keys 37 stored in memory 30 according to one or more particular encryption schemes as described in greater detail herein. Preferably, the cryptographic module 35 implements a FIPS (Federal Information Processing Standards)-140-2 or its successor approved, most preferably a FIPS-140-2 level 1 or greater approved, symmetric encryption scheme by utilizing a known FIPS-140-2 approved encryption algorithm such as DES or Triple DES.

Smart card reader device 10 further includes a wireless communications device 40, such as an RF transceiver, that is in electronic communication with processor 25. In the preferred embodiment, wireless communications device 40 is a Bluetooth radio that communicates using the Bluetooth wireless communications protocol. Finally, smart card reader device 10 is provided with electrical contacts 45 that are in electronic communication with processor 25. Electrical contacts 45 are adapted to make electrical contact with complementary electrical contacts 50 that are provided on smart card 15 to enable smart card reader device 10 and smart card 15 to exchange information.

Smart card 15 further includes integrated circuit chip 55 embedded therein (see FIG. 2A). Integrated circuit chip 55 includes processor 60 in electronic communication with memory 65, which is preferably, although not necessarily, flash memory. Memory 65 stores routines that are executable by the processor 65, including cryptographic module 70 which enables smart card 15 to encrypt and decrypt information according to a particular encryption scheme. In the preferred embodiment, cryptographic module 70 implements a public-key cryptography scheme such as Diffie-Hellman or RSA. Memory 65 also stores keys 75 used by smart card 15 to encrypt and decrypt information. Preferably, keys 75 include a public key and corresponding private key (preferably stored as part of a public key certificate) assigned to smart card 15 for use in the public-key cryptography scheme implemented by cryptographic module 70.

Computing device 20 includes processor that, like processor 25, may be, without limitation, a microprocessor (.mu.P). Computing device 20 further includes a wireless communications device 85, such as an RF transceiver, that is in electronic communication with processor 80. Wireless communications device 85 is compatible with and able to communicate with wireless communications device 40 of smart card reader device 10. In the preferred embodiment, wireless communications device 85 is a Bluetooth radio.

The processor 80 controls the operation of computing device 20 by executing routines stored in a memory 90 that is in electronic communication with processor 80. Memory 90 can be any of a variety of types of internal and/or external storage media such as, without limitation, RAM, ROM, EPROM(s), EEPROM(s), and the like, alone or in combination, that provide a storage register for data storage such as in the fashion of an internal storage area of a computer, and can be volatile memory or nonvolatile memory. Memory 90 includes cryptographic module 95 in the form of one or more of the stored routines. Cryptographic module 95, when executed by processor 80, enables computing device 10 to encrypt and decrypt information using one or more keys 100 stored in memory 90 according to one or more particular encryption schemes as described in greater detail herein. Preferably, like cryptographic module 70, the cryptographic module 95 implements a FIPS-140-2 or its successor approved encryption scheme, most preferably a FIPS-140-2 level 1 or greater symmetric encryption scheme. Cryptographic module 95 is compatible with and similar to cryptographic module 70 such that smart card reader device 10 and computing device 20 can exchange encrypted messages, with each being able to decrypt a message received from the other.

As noted above, according to an aspect of the invention, smart card reader device 10 and computing device 20 are able to exchange encrypted messages so that data can be transferred back and forth between the two in a secure manner. In one particular embodiment, cryptographic modules 35 and 95 implement a FIPS-140-2 or its successor approved symmetric encryption scheme as described above and keys 37 and 100 each include a shared secret key. When a message is to be encrypted, the sending device (either smart card reader device 10 or computing device 20, as the case may be) generates a new, unique session key, and the session key is used to encrypt the message. The session key is then encrypted using the shared secret key, and the encrypted message and encrypted session key are wirelessly transmitted (through wireless communications devices 40 and 85) to the other device. When received, the other device (either smart card reader device 10 or computing device 20, as the case may be) decrypts the encrypted session key using the stored shared secret key, and then uses the decrypted session key to decrypt the encrypted message.

In another particular embodiment, smart card communications system 5 as just described may be used to send and receive encrypted and/or digitally signed email messages. Specifically, computing device 20 is provided with an email program employing a scheme such as S/MIME or PGP that uses both symmetric (secret key) and asymmetric (public key) cryptography techniques. As noted above, after the user of computing device 20 creates an email message, the email program generates a symmetric session key and uses the session key to encrypt the email message. The session key is then encrypted using the message recipient's public key (preferably obtained from that recipient's public key certificate).

Next, the message may be signed by creating a digest of the message using a message digest algorithm such as SHA-1 or MD5 and encrypting the digest using the private key of the user of computing device 20 (that is stored in memory 65 of smart card 15). According to an aspect of the invention, this step is performed wirelessly in a secure manner. Specifically, the message digest is created by computing device 20 and it and the smart card password (which is input into computing device 20 by the user) are wirelessly transmitted to the smart card reader device 10 (through cooperation of wireless communication devices 85 and 40) using the secure, encrypted channel described above (i.e., using the shared secret key and a newly generated session key). Once received, this information is decrypted as described above, and the message digest is sent to smart card 15 (through contacts 45 and 50) where it is encrypted with the stored private key, thus creating a digital signature. The digital signature is then sent back to smart card reader device 10 (through contacts 45 and 50) and is subsequently wirelessly transmitted back to computing device 20 using the secure, encrypted channel described above for subsequent transmission to the recipient along with the encrypted message.

When a user of computing device 20 receives an encrypted email message from another party, the smart card password (entered into computing device 20 by the user) and the encrypted session key (the one used by the sending party to encrypt the email message, not the one used in the encrypted channel between the computing device 20 and the smart card reader device 10) are wirelessly transmitted to the smart card reader device 10 (through cooperation of wireless communication devices 85 and 40) using the secure, encrypted channel described above (i.e., using the shared secret key and a newly generated session key). Once received, this information is decrypted as described above, and the encrypted session key is sent to smart card 15 (through contacts 45 and 50) where it is decrypted with the stored private key. The decrypted session key is then sent back to the smart card reader device 10 (through contacts 45 and 50) and is subsequently wirelessly transmitted back to computing device 20 using the secure, encrypted channel described above where it is used to decrypt the encrypted email message that was received.

As will be appreciated, each of these operations (creating an encrypted and/or digitally signed email and decrypting a received encrypted email) are performed without the private key of the user of computing device 20 ever leaving that user's smart card 15. In addition, these operations are also performed wirelessly without any key information or smart card password information being transmitted between devices in an unencrypted (clear text), unsecured manner. In fact, that information is preferably transmitted between devices using FIPS-140-2 or its successor approved encryption.

Figure 3:
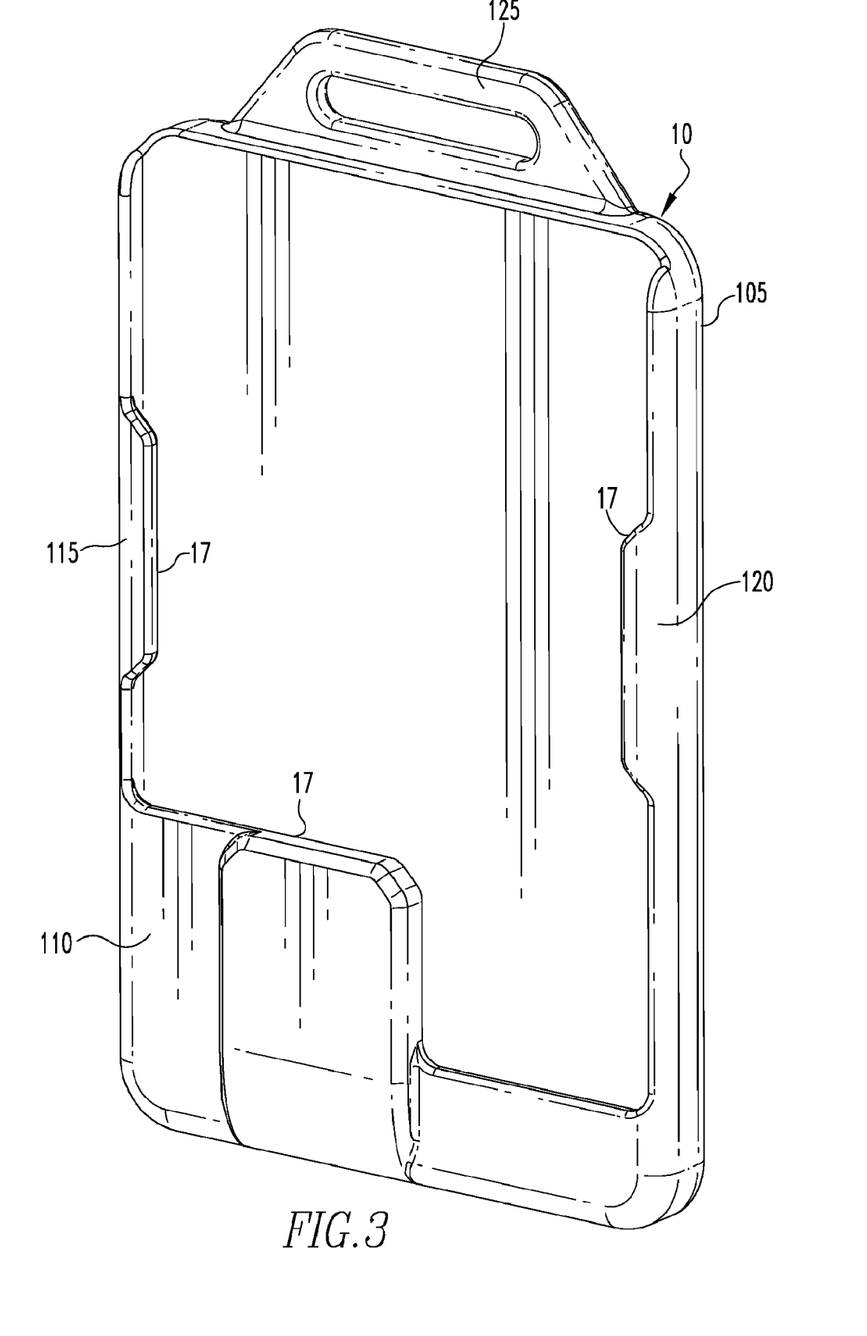
FIG. 3 is an isometric view of one particular embodiment of the smart card reader device shown in FIG. 1.
Figure 4:
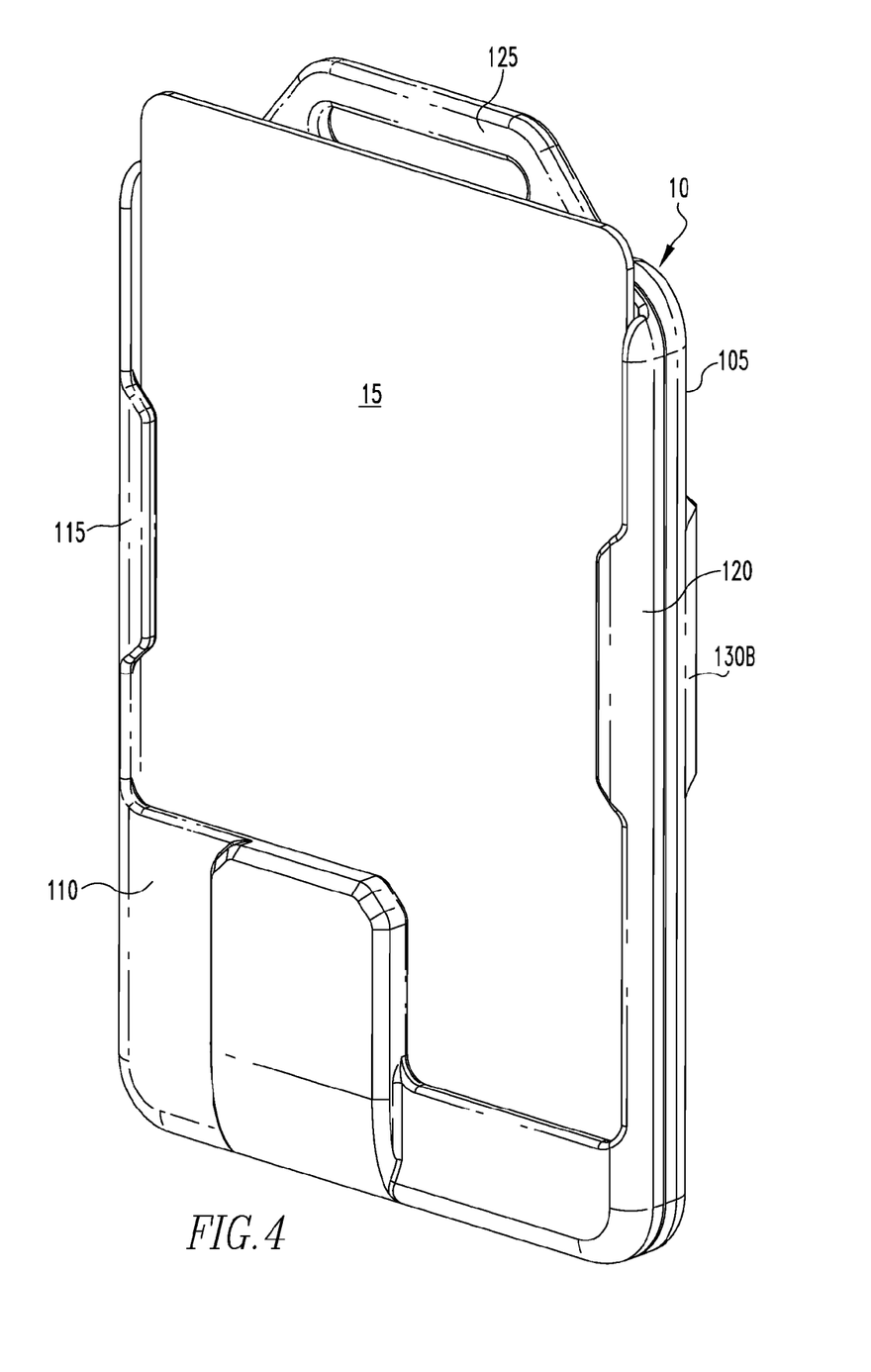
FIGS. 4, 5, 6 and 7 are isometric, front, side and bottom views, respectively, of the smart card reader device shown in FIG. 3 having a smart card received therein.
Figure 5:
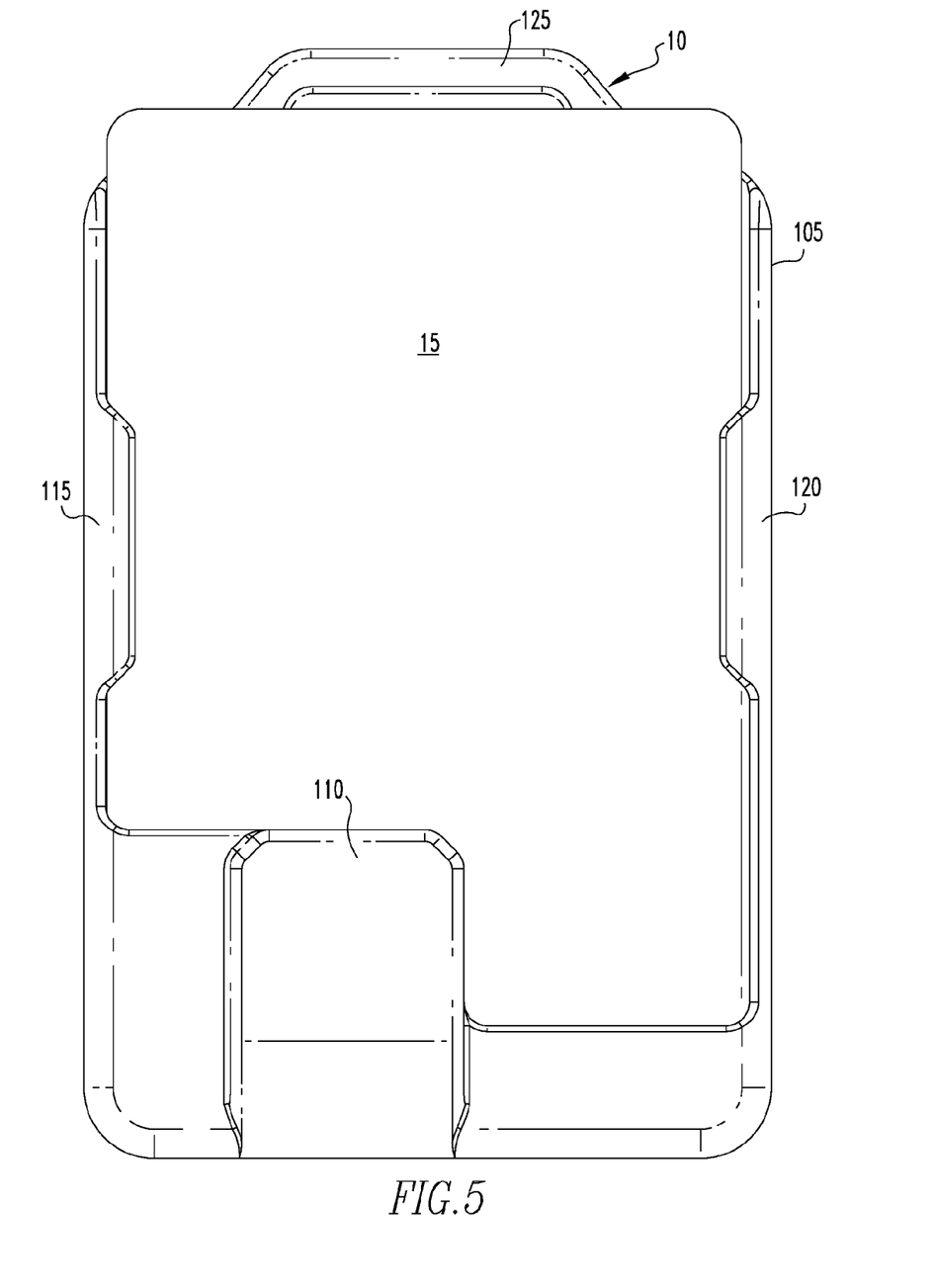
Figure 6:
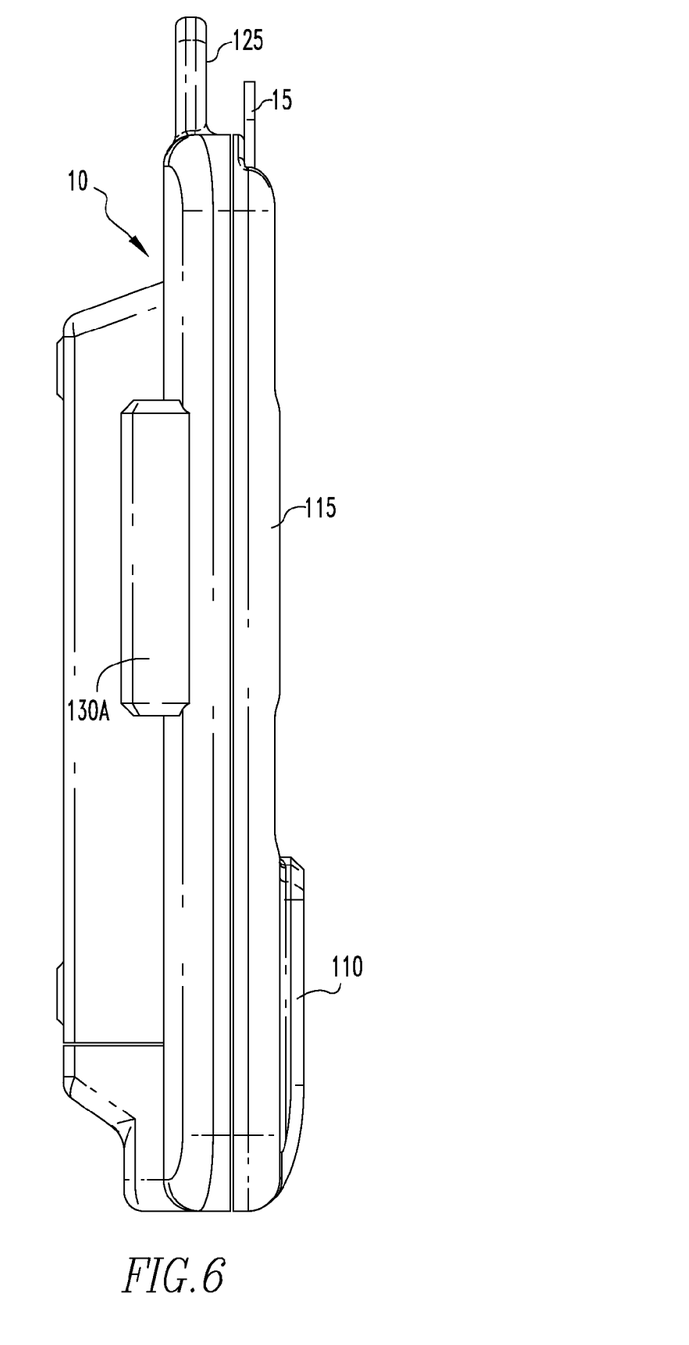

FIG. 3 is an isometric view of one particular embodiment of the smart card reader device 10. FIGS. 4, 5, 6, and 7 show isometric, front, side and bottom views, respectively, of the smart card reader device 10 shown in FIG. 3 having smart card 15 received therein. The embodiment of smart card reader 10 shown in FIGS. 3, 4, 5, 6, and 7 is portable and preferably wearable by the user thereof. Smart card reader 10 shown in FIGS. 3, 4, 5, 6, and 7 includes housing 105, preferably made of a molded lightweight plastic material, that houses the components shown in FIG. 1 (processor 25, memory 30, wireless communications device 40, and contacts 45). Housing 105 has a channel 17 (FIG. 3) provided on the front face thereof for receiving and holding a smart card 15 as shown in FIGS. 4 and 5. The channel 17 is defined on three sides by lower flange portion 110 and left and right side flange portions 115 and 120 of housing 105. As seen in FIGS. 4 and 5, the lower flange portion 110 and left and right side flange portions 115 and 120 are sized so that a large portion of the front face of smart card 15 will remain visible when the smart card 15 is inserted in the channel so that personal/identifying information provided on the smart card 15 can been readily seen by a guard or the like. In addition, the contacts 45 are housed and supported by lower flange portion 110 such that contacts 45 are caused to be aligned with and make electrical contact with contacts 50 of the smart card 15 when it is inserted in the channel.

Figure 7:
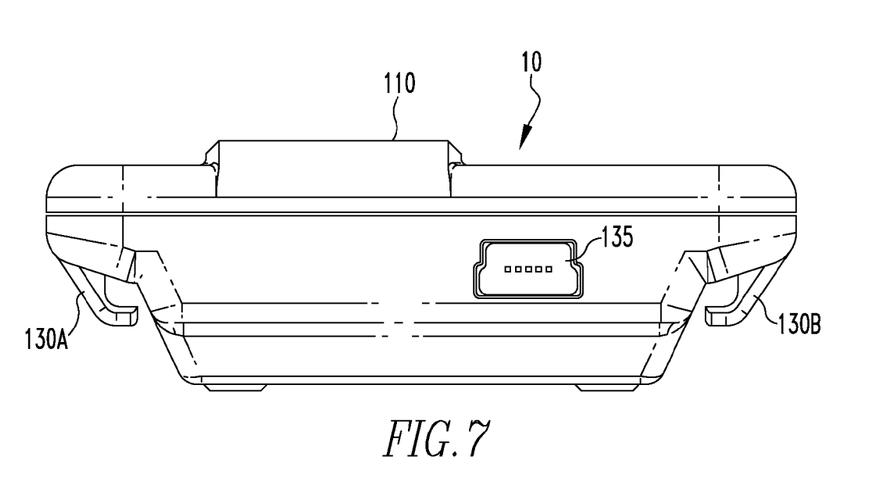

The embodiment of smart card reader device 10 shown in FIGS. 3, 4, 5, 6, and 7 further includes at least one attachment mechanism for attaching the smart card reader 10 to the body or clothing of the user, thereby enhancing the portable nature of the smart card reader 10. Specifically, the smart card reader device 10 shown in FIGS. 3, 4, 5, 6, and 7 includes an upper loop portion for receiving a lanyard or the like therethrough so that the smart card reader device 10 may be worn around the user's neck like a necklace. The smart card reader device 10 shown in FIGS. 3, 4, 5, 6, and 7 also includes fastening arms 130A and 130B (FIG. 7) for receiving opposite ends of a strap or the like so that the smart card reader device 10 can be attached to a portion of the user's body, such as the user's upper arm. As will be appreciated, any of a number of alternative fastening mechanisms may also be employed, such as a clip provided on the rear of the smart card reader device 10 for attaching it to the user's belt or a pocket or button on the user's shirt or jacket. Finally, as seen in FIG. 7, the smart card reader device 10 includes a USB port 135 for enabling USB connections to be made thereto. While the preferred embodiment utilizes a USB connection, it will be understood that other connections such as other types of serial (e.g., RS-232) connections, PCMCIA, or a parallel port may also be used.

Thus, the invention provides a smart card reader device and a smart card communications system that overcomes the problems of the prior art. In particular, the invention provides a portable, lightweight, and preferably wearable smart card reader device that is able to securely communicate with an associated computing device to securely exchange information such as the smart card password and encryption keys. Because the smart card reader device is wearable and portable, a user is more easily able to keep it with him or her at all relevant times, thereby eliminating the problem of inadvertently leaving a smart card in a reader device that is physically coupled to a computing device.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A portable device for receiving a smart card having an integrated circuit chip and a front face having identifying information provided thereon, the portable device comprising:

a housing having a channel arranged to receive the smart card, the channel being defined by a flange portion and a lower portion, the channel being arranged in a manner wherein, when the smart card is received in the channel, the lower portion covers the integrated circuit chip and a portion of the identifying information is visible, the housing further comprising an attachment mechanism for enabling the portable device to be worn;

a processor in electronic communication with the integrated circuit chip when the smart card is received in the channel, the processor, in use, encrypting a session key, thereby producing encrypted session key; and a transceiver in electronic communication with the processor, the transceiver, in use, wirelessly transmitting the encrypted session key to a computing device.

2. The portable device of claim 1 wherein the lower portion includes a contact adapted to make electrical contact with the smart card.

3. The portable device of claim 1 further comprising a memory in electronic communication with the processor, the memory storing a routine for execution by the processor to carry out the encrypting information.

4. The portable device of claim 1 wherein the transceiver comprises a Bluetooth radio.

5. The portable device of claim 1 wherein the transceiver comprises a Radio Frequency transceiver.

6. The portable device of claim 1 wherein the attachment mechanism comprises a clip.

7. The portable device of claim 1 wherein the attachment mechanism comprises a portion for receiving a lanyard.

8. The portable device of claim 1 wherein the attachment mechanism comprises first and second arm portions for receiving and holding a strap.

9. The portable device of claim 1, the channel further being defined by a second flange.

10. The portable device of claim 1, the channel adapted to hold the smart card on three sides.

* * * * *